(12) United States Patent
Tsujita et al.

(10) Patent No.: US 6,355,311 B1
(45) Date of Patent: Mar. 12, 2002

(54) METHOD FOR MAKING AN OPTICAL RECORDING MEDIUM AND AN OPTICAL RECORDING MEDIUM OBTAINED BY THE METHOD

(75) Inventors: Kouji Tsujita, Yokohama; Ichiro Ueno, Isehara; Norio Tanaka, Tokyo, all of (JP)

(73) Assignees: Victor Company of Japan Ltd.; Dainichiseika Color & Chemicals Mfg. Co. Ltd.

( * ) Notice: Subject to any disclaimer, the term of this patent is extended or adjusted under 35 U.S.C. 154(b) by 0 days.

(21) Appl. No.: 09/476,122

(22) Filed: Jan. 3, 2000

Related U.S. Application Data

(62) Division of application No. 09/030,078, filed on Feb. 25, 1998, now abandoned.

(30) Foreign Application Priority Data

Feb. 25, 1997 (JP) .............................................. 9-056860

(51) Int. Cl.⁷ .............................. B05D 3/00; B05D 1/02; C23C 16/00
(52) U.S. Cl. .................. 427/561; 427/568; 427/255.14; 427/162; 427/168; 427/422; 427/901
(58) Field of Search ................................. 427/561, 568, 427/552, 554, 557, 558, 162, 166, 255.14, 422, 901, 164, 168

(56) References Cited

U.S. PATENT DOCUMENTS

| | | | | |
|---|---|---|---|---|
| 5,403,625 A | * | 4/1995 | Legierse et al. | 427/425 |
| 5,456,943 A | * | 10/1995 | Guhl et al. | 427/437 |
| 5,688,565 A | * | 11/1997 | McMillan et al. | 427/427 |
| 5,702,792 A | * | 12/1997 | Iida et al. | 428/64.1 |
| 5,820,942 A | * | 10/1998 | Singh et al. | 427/561 |
| 5,965,212 A | * | 10/1999 | Dobson et al. | 427/427 |
| 6,143,370 A | * | 11/2000 | Panagiotou et al. | 427/255.14 |

FOREIGN PATENT DOCUMENTS

| | | | |
|---|---|---|---|
| JP | 6-306181 | * | 11/1994 |
| JP | 7-18693 | * | 1/1995 |
| JP | 7-252671 | * | 10/1995 |

OTHER PUBLICATIONS

"New Technique for Coprecipitation of Organic Dye with Polymer Under High vacuum", T. Hiraga et al., J. Vac. Sci. Technol., A12(3), May/Jun. 1994.*

"Fabrication of Dye–Dispersed Optical–Quality Polymer Films by Corporation of Cyanide Dye with Polymers", by T. Hiraga et al., Jpn. J. Appl. Phys. vol. 33, No. 9A, part 1, 1994, pp. 5051–5059, Sep. 1994.*

"New Technique for Coprecipitation of Organic Dye with Polymer Under High Vacuum", by T. Hiraga et al., J. Vac. Sci. Technol., A12(3), May/Jun. 1994.

"Fabrication of Dye–Dispersed Optical–Quality Polymer Films by Corporation of Cyanide Dye with Polymers", by T. Hiraga et al., Jpn. J. Appl. Phys. vol. 33, No. 9A, part 1, 1994, pp. 5051–5059, Sep. 1994.

* cited by examiner

*Primary Examiner*—Marianne Padgett
(74) *Attorney, Agent, or Firm*—McDermott, Will & Emery

(57) ABSTRACT

A method for making an otical recording medium comprises providing a substrate which is encoded with information in the form of pits and/or a continuous groove beforehand at least on one side thereof, spraying a solution or dispersion of a film-forming material containing at least one organic compound having optical functionality in the form of a mist onto the encoded side of the substrate in a vacuum chamber under conditions sufficient to permit a thin film to be formed thereon in a substantially solvent-free condition, and drying the thin film. An optical recording medium obtained by the method is also described.

9 Claims, 3 Drawing Sheets

METHOD FOR MAKING AN OPTICAL RECORDING MEDIUM AND AN OPTICAL RECORDING MEDIUM OBTAINED BY THE METHOD

This application is a Divisional of application Ser. No. 09/030,078 filed Feb. 25, 1998 now abandoned.

BACKGROUND OF THE INVENTION

1. Field of The Invention

This invention relates to a method for making an optical recording medium for high-density recording, and more particularly, to a method for making an optical disk of the read-only, write-once or rewriteable type. The invention also relates to such an optical recording medium as mentioned above.

2. Description of the Prior Art

In recent years, read-only optical disks, in which information is recorded in high density, write-once optical disks capable of recording information only once, and rewriteable magnetooptical (MO) disks or phase change (PC) disks, have started to rapidly come into wide use, not to mention compact disks. Among them, those optical disks, which comprise a recording layer containing organic materials, have been extensively developed and now put into practical use.

Organic compounds are more versatile in kind than metals or inorganic compounds, and enable a diversity of functions to be developed by structurally designing same at a molecular level, making it easy to realize high-density recording and high sensitivity. For instance, as a write-once CD (CD-R), there is provided an inexpensive optical disk of high productivity, whose recording layer is formed by spin-coating an organic dye, dissolved in solvent, on a transparent resin substrate having a spiral, continuous groove cut therein.

Further, studies have been made on so-called "superresolution" optical disks, wherein an optically transparent substrate, in which information is encoded as pits beforehand, is formed thereon with a mask layer containing a reversible dye such as a thermochromic or photochromic compound.

In the optical disk formed with the mask layer, the nonlinear change of light transmittance against light intensity inherent to reversible dyes, such as thermochromic or photochromic compounds, are utilized in a manner as follows. The spot size of a laser beam, which is restricted depending the wavelength of an irradiated laser beam and the numerical aperture (NA) of a pickup lens, can be made smaller than that of the irradiated beam by causing the laser beam to be transmitted only at an intense region of a beam intensity distribution thereof. This enables smaller pits to be reproduced, and as a result, higher densification can be achieved.

As is known in the art, a layer containing such an organic compound as mentioned above has been formed according to the aforesaid spin-coating technique. In a write-once optical disk making use of an organic dye in the recording layer, such as CD-R, usual practice is to form a recording layer by spin-coating an organic dye, dissolved in a solvent, onto a transparent resin substrate having a spiral, continuous groove therein. In this connection, however, an optical disk of next generation, which is so designed as to record in a density higher than conventional optical disks, such as a compact disk, the size and depth of pits and the dimensions such as of a width and depth of the continuous groove tend to become smaller. When a solution of a dye dissolved in solvent is spin-coated onto a substrate formed with such small and shallow pits and such a fine and shallow groove therein, the pits and the groove are filled up with the coated dye, thereby presenting the problem of causing signal characteristics to be degraded owing to the difficulty in tracking the groove and pits at the time of recording and reproduction.

From the standpoint of costs and mass-productivity, most of the recent optical disks make use, as a substrate, of non-crystalline, light-transmitting thermoplastic polymer materials such as polycarbonates. However, the non-crystalline thermoplastic polymer materials, in most cases, exhibit a relatively low resistance to organic solvents. This causes the following problems.

(1) The types of organic solvents, which are usable for the formation of an organic matter-containing layer on the substrate by spin coating and which do not attack the substrate, are limited.

(2) The types of organic matters, such as dyes, to be dissolved in such organic solvents incapable of attacking the substrate are more restricted.

On the other hand, aside from the spin-coating method of forming an organic compound-containing layer, a vacuum deposition method has been studied in order to provide optical disks. For instance, according to Japanese Laid-open Patent Application No. 7-18693, there is disclosed a so-called "superresolution" optical disk wherein its mask layer having a reversible dye, such as a thermochromic dye, is formed by vacuum deposition under heat. The formation, by vacuum deposition under heat, of such a mask layer as mentioned above on a substrate having small pits therein as formed in a "superresolution optical disk" disenables the pits to be filled up as experienced in the spin-coating method, realizing a high-quality superresolution optical disk.

However, the vacuum deposition under heat has limitations described below and are not always satisfactory in this regard.

(1) Organic compounds, which can be stably deposited, are limited in type. For instance, since organic ionic dyes such as cyanine dyes and polymer compounds do not exhibit any sublimation, they cannot be formed as a film according to the vacuum deposition under heat.

(2) Even if organic compounds used have sublimating properties, they are ordinarily more decomposable than inorganic materials on heating, so that the film-forming speed cannot increase so much, and it undesirably takes a relatively long time for the film formation.

(3) It is difficult to carry out deposition from a single target obtained by mixing a plurality of types of organic compounds while controlling the sublimation speeds of the respective compounds. For the simultaneous vacuum deposition of a plurality of types of organic compounds, a vacuum deposition source for every organic compound has to be provided.

In order to overcome the drawbacks of the vacuum decomposition methods, spraying methods have been proposed, for example, in Japanese Laid-open patent Application Nos. 6-306181 and 7-252671 and also by T. Hiraga et al (J. Vac. Sci. Technol., A12(3), pp. 876–878 (1994) ) and by T. Hiraga et al (Jpn. J. Appl. Phys., 33(9A), 5051–5059 (1994)).

In the methods of the Japanese references, it is stated that a substrate is heated to a temperature not exceeding a thermal decomposition temperature of an organic deposit to remove volatile matter therefrom. The substrate is heated by means of a heater in contact therewith. Under conditions where the substrate placed in a high-vacuum chamber is heated to a temperature lower than the thermal deformation temperature of the substrate, e.g. 150° C., if a sprayed mist arrived at the substrate has a large amount of a solvent left therein (e.g. 50wt %), the substrate is rapidly cooled owing to the heat of vaporization of the solvent. When the substrate is made, for example, of a metal or glass having high thermal conductivity, the heat energy corresponding to the heat of vaporization can be immediately supplied from the heater to the substrate. However, where an organic material, e.g. polycarbonate, having low thermal conductivity is used as the substrate, the surface temperature of the substrate considerably lowers, requiring a long time before the vaporization of the solvent left in the deposit on the surface.

We have experimentally confirmed that the above methods are applied to a substrate, which has been encoded with information in the form of pits beforehand or which has a groove or grooves to form a mask layer on the substrate, the pits and/or groove is significantly deformed. More particularly, a thin film of an organic material cannot be formed while keeping the pits and/or groove substantially in original form. Presumably, this is considered due to the fact that when an organic polymer material is used as the substrate, an organic solvent left in contact with the substrate deforms the surface profile of the substrate, and that the deposit containing a large amount of a solvent is caused, more or less, to flow owing to the presence of the solvent before the vaporization thereof, thus making a relatively flat surface. Anyway, the pits and/or groove in the substrate are appreciably deformed or, in the worst case, broken. In the case where glass or other types of materials resistant to solvent are used as a substrate encoded with information, the pits and/or groove may not be reproduced reliably by coverage with an organic deposit.

In the Hiraga et al reports, a spray nozzle heater is used. This heater may be effective, to an extent, in preventing a solvent from being solidified when the temperature lowers owing to the vaporization of the solvent. However, it is not believed that a heat energy necessary for complete vaporization of a solvent is applicable, from outside, to a solution or dispersion being sprayed.

Physical properties of ordinary organic solvents are shown in Tables 1 and 2 below.

TABLE 1

| Solvent | Boiling Point (° C.) | Melting Point (° C.) | $T_{v\text{-}m}$ (K) | Heat of Evaporation (kJ/mol) | Specific Heat (J/mol/K) | $T_{vp}$ (K) |
| --- | --- | --- | --- | --- | --- | --- |
| methanol | 64.7 | −97.5 | 162.2 | 35.27 | 81.06 | 435 |
| ethanol | 78.3 | −130 | 208 | 38.6 | 111.4 | 346 |
| isopropyl alcohol | 82.3 | −89.5 | 171.8 | 41.49 | 152.89 | 271 |
| n-butyl alcohol | 117.7 | −89.8 | 207.5 | 44.39 | 179 | 248 |
| ethyl acetate | 77.11 | −83.6 | 160.7 | 35.62 | 169 | 211 |
| isopropyl acetate | 88.6 | −73.4 | 162.0 | 37.2 | 223 | 167 |
| n-butyl acetate | 126.2 | −73.5 | 199.6 | 43.64 | 223 | 196 |
| acetone | 56.1 | −94.7 | 150.8 | 29.6 | 126.7 | 234 |
| methyl ethyl ketone | 79.6 | −86.3 | 165.9 | 32.0 | 158.1 | 202 |
| methyl isobutyl ketone | 116.2 | −84 | 200.2 | 34.6 | 191.6 | 181 |
| diethyl ether | 34.6 | −116 | 150.6 | 26.78 | 166.9 | 160 |

TABLE 1-continued

| Solvent | Boiling Point (° C.) | Melting Point (° C.) | $T_{v\text{-}m}$ (K) | Heat of Evaporation (kJ/mol) | Specific Heat (J/mol/K) | $T_{vp}$ (K) |
| --- | --- | --- | --- | --- | --- | --- |
| dichloromethane | 39.8 | −96.7 | 136.5 | 27.96 | 99.4 | 281 |
| chloroform | 61.3 | −63.2 | 124.5 | 29.5 | 117.0 | 252 |
| carbon tetrachloride | 76.7 | −22.9 | 99.6 | 29.95 | 133.2 | 225 |
| 1,2-dichloroethane | 83.7 | −35.3 | 119.0 | 32.01 | 127.5 | 251 |
| 1,1,2-trichloroethane | 113.7 | −37.0 | 150.7 | 38.0 | 148.5 | 256 |
| trichloroethylene | 86.7 | −87.1 | 173.8 | 31.5 | 123.6 | 255 |
| toluene | 110.6 | −95.2 | 205.8 | 33.18 | 103.3 | 321 |
| n-pentane | 36.0 | −129.8 | 165.8 | 25.77 | 118.4 | 218 |
| n-hexane | 68.7 | −95.4 | 164.1 | — | — | — |
| n-heptane | 98.4 | −90.6 | 189 | — | — | — |
| acetonitrile | 81.8 | −45.7 | 127.5 | 32.8 | 51.88 | 632 |
| propionitrile | 97.2 | −91.8 | 189.0 | — | — | — |
| pyridine | 115.5 | −42 | 157.5 | 35.53 | 136 | 261 |
| triethylamine | 89.4 | −114.5 | 203.9 | — | — | — |
| nitromethane | 101.3 | −28.4 | 129.7 | — | — | — |
| carbon disulfide | 46.3 | −111 | 157.3 | 26.8 | 18.26 | 1467 |

TABLE 2

| Solvent | Boiling Point (° C.) | Melting Point (° C.) | $T_{v\text{-}m}$ (K) | Heat of Evaporation {kJ/mol} | Specific Heat (J/mol/K) | $T_{vp}$ (K) |
| --- | --- | --- | --- | --- | --- | --- |
| n-amyl alcohol | 138.0 | −78.2 | 216.2 | 44.48 | 209 | 213 |
| cyclohexanol | 161.1 | 25.2 | 135.9 | 45.2 | 214.98 | 210 |
| benzyl alcohol | 205.8 | −15.3 | 221.1 | 53.60 | 244.42 | 219 |
| ethylene glycol | 197.6 | −13 | 210.6 | 52.33 | 150 | 349 |
| n-amyl acetate | 149.2 | −70.8 | 220.0 | 41 | 276 | 149 |
| cyclohexanone | 155.7 | −31.2 | 186.9 | 40.2 | 177.8 | 226 |
| dibutyl ether | 142.0 | −95.4 | 237.4 | — | — | — |
| benzene | 80.1 | 5.5 | 74.6 | 30.76 | 80.8 | 381 |
| chlorobenzene | 131.7 | −45.3 | 177.0 | 37.27 | 150.8 | 247 |
| cyclohexane | 80.7 | 6.5 | 74.2 | — | — | — |
| water | 100.0 | 0.0 | 100.0 | 40.66 | 75.42 | 539 |

In the above Tables, Tvp is a value of an "imaginary temperature drop accompanied by vaporization" which is obtained by dividing heat of vaporization (joules/mole) by specific heat (joule/mol/K) on the assumption that the specific heat of a solvent and the heat of vaporization are, respectively, a constant in a temperature range of from its melting point to boiling point. In practice, the heat of vaporization increases and the specific heat decreases along with the temperature drop of solvent, so that it is considered that an actual temperature drop is greater than the imaginary temperature drop. As will be seen from Tables 1 and 2,the values of Tvp of a number of solvents are indicated. Most of the solvents have the Tvp values which individually exceed the differences in temperature between the melting and boiling points, or the values of Tv-m in the tables. This means that if droplets of a solvent at a boiling point at normal pressures is placed in vacuum, the solvent suffers a temperature drop to its melting point before complete vaporization of the solvent and is solidified. The "sublimation" of the resultant solid proceeds much slower than vaporization. The heating of the spray nozzle fails to prevent information pits in a substrate from being deformed or broken.

SUMMARY OF THE INVENTION

It is accordingly an object of the invention to provide a method for making an optical recording medium which overcomes the problems involved in prior art counterparts.

It is another object of the invention to provide a method for making an optical recording medium wherein a substrate, which has information pits and/or a guide groove therein, is formed thereon with a thin film by spraying, in vacuum, a mist of a solution or dispersion containing an organic compound while causing a solvent to be evaporated from the mist to an extent as much as possible during the time before the mist arrives at the substrate surface whereby the mist arrived at the substrate surface deposits along the surface profile of the substrate without permitting any further flow of the deposit.

It is a further object of the invention to provide a method for making an optical recording medium wherein a substrate, which has information pits and/or a guide groove therein, is formed therein with a thin film by spraying, in vacuum, a solution or dispersion containing an organic compound in the form of a mist while causing a solvent to be evaporated from the mist to an extent as much as possible during the time before the mist arrives at the substrate surface whereby the information pits and/or a guide groove is prevented from deforming or breaking by dissolving the substrate with the solvent.

It is another object of the invention to provide an optical recording medium obtained by the method mentioned above.

The above objects can be achieved, according to the invention, by a method which comprises providing a substrate which is encoded with information in the form of pits and/or a continuous groove beforehand at least on one side thereof, spraying a solution or dispersion of a film-forming material containing at least one organic compound having optical functionality onto the encoded side of the substrate in a vacuum chamber under conditions sufficient to permit a thin film to be formed thereon in a substantially solvent-free condition, and drying the thin film.

The substrate used should preferably be made of a light-transmitting material such as a light-transmitting thermoplastic polymer. It should be noted that the term "substantially solvent-free condition" means one where substantially all of the solvent is not present in sprayed mist or droplets of the solution or dispersion at the time when the mist contacts with the side of the substrate being sprayed, but such a solvent may be left in amounts not adversely affecting the substrate and the like.

DETAILED DESCRIPTION AND EMBODIMENTS OF THE INVENTION

Figure 1:
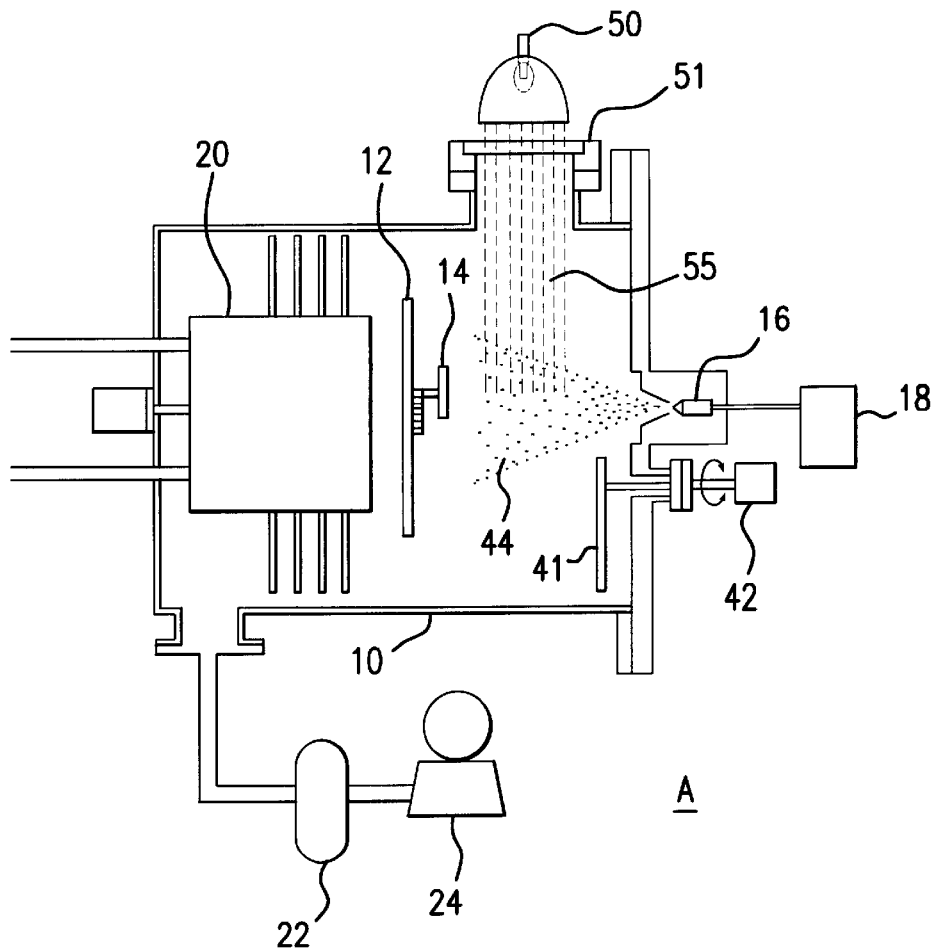
FIG. 1 is a schematic sectional view showing an example of a vacuum film-forming apparatus used to make an optical recording medium of the invention.

In the method of the invention, a substrate is initially provided. The substrate may be of any types including those for compact disks, write-once optical disks, rewriteable magnetooptical disks or phase change disks, or superresolution optical disks as described herein in the "Prior Art".In the practice of the invention, the substrate used should be encoded with information beforehand in the form of pits and/or a continuous groove at least at one side thereof.

The materials for the substrate are not critical in type, and should preferably have high light transmittance. Examples of the material include glasses, thermoplastic resins such as polycarbonates, polymethyl methacrylate and the like, thermosetting resins such as epoxy resins, and the like. Of these, light-transmitting thermoplastic resins such as polycarbonates are preferred.

Then, a thin film, which contains an organic compound having optical functionality, is formed on the encoded side of the substrate by spraying. The term "optical functionality" used herein means the function of optical recording, the masking function for superresolution, the function of undergoing reversible color developing and bleaching reactions, and photochromism and thermochromism which are, respectively, induced by absorption of light, and the like.

Examples of the organic compound include organic dyes, fluorescent dyes, IR absorbing dyes, UV absorbing dyes, photochromic dyes, thermochromic dyes, and other known ones ordinarily used for this purpose. Specific examples of the dyes include xanthene dyes such as Rhodamine B, Rhodamine 6G, Eosine, Phloxine B and the like, acridine dyes such as Acridine Orange, Acridine Red and the like, azo dyes such as Ethyl Red, Methyl red and the like, porphyrin dyes, phthalocyanine dyes, cyanine dyes such as 3,3'-diethylthiacarbocyanine iodide, 3,3'-diethyloxadicarbocyanine iodide and the like, merocyanine dyes, styryl dyes, oxonol dyes, triarylmethane dyes, and the like.

These dyes may be used singly or in combination depending on the purpose in end use. Further, these dyes may be used in combination with binder resins.

The binder resins are not critical with respect to the type thereof. Preferably. thermoplastic polymers are used including, for example, resins such as polystyrene, poly($\alpha$-methylstyrene), polyindene, poly(4-methyl-1-pentene), polyvinylpyridine, polyvinylformal, polyvinylacetal, polyvinylbutyral, polyvinyl acetate, polyvinyl alcohol, polyvinyl chloride, polyvinylidene chloride, polyvinyl methyl ether, polyvinyl ethyl ether, polyvinyl benzyl ether, polyvinyl methyl ketone, poly(N-vinylcarbzole), poly(N-vinylpyrrolidone), polymethyl acrylate, polyethyl acrylate, polyacrylic acid, polyacrylonitrile, polymethyl methacrylate, polyethyl methacrylate, polybutyl methacrylate, polybenzyl methacrylate, polycyclohexyl methacrylate, polymethacrylic acid, polyamide methacrylate, polymethacrylonitrile, polyacetaldehyde, polychloral, polyethylene oxide, polypropylene oxide, polyethylene terephthalate, polybutylene terephthalate, polycarbonates of bisphenols and carbonic acids, poly(diethylene glycol/bis-allylcarbonates), 6-nylon, 6,6-nylon, 12-nylon, 6,12-nylon, polyethyl asparatate, polyethyl glutamate, polylysine, polyproline, poly($\gamma$-benzyl-L-glutamate), methyl cellulose, hydroxypropyl cellulose, acetyl cellulose, cellulose triacetate, cellulose tributylate, polyurethane resins and the like, organopolysiloxanes such as poly (phenylmethylsilane), organopolygermanium compounds, and copolymers or co-polycondensates of monomeric constituents in the above-mentioned polymers or resins.

The fabrication of the optical recording medium according to the invention is particularly described.

Initially, an organic compound with or without a resin binder is dissolved or dispersed in a liquid medium to provide a thin film-forming material in the form of a solution or dispersion.

The liquid mediums used for this purpose may be any ones which are able to dissolve or disperse an organic compound and/or a binder resin therein and are volatile and non-corrosive. Preferably, there are used those solvents or liquid mediums, which have a boiling point of from 30° C. to 120° C., more preferably from 40 to 100° C., at 1 atm, and a melting point of −20° C. or below, more preferably −40° C. or below. In general, compounds having too low a boiling point volatilize so rapidly that they are difficult to handle. On the other hand, compounds having a boiling point higher than 120° C. are disadvantageous in that they cannot be readily removed from the resultant thin film to a full extent, taking a long time before the complete removal.

The solvents or liquid mediums, which satisfy the above requirements, are listed in Table 1 indicated before although other types of mediums including those indicated in Table 2, which are outside the preferred ranges of either or both of melting and boiling points, may also be used, if required. Specific and preferred examples include lower alcohols such as methanol, ethanol, isopropyl alcohol and n-butyl alcohol, esters such as ethyl acetate, isopropyl acetate and n-butyl acetate, ketones such as acetone, methyl ethyl ketone and methyl isobutyl ketone, halogenated hydrocarbons such as chloroform, carbon tetrachloride, dichloromethane, 1,2-dichloroethane, 1,1,2-trichloroethane and trichloroethylene, aromatic hydrocarbons such as toluene, aliphatic hydrocarbons such as n-pentane, n-hexane and n-heptane, nitrites such as acetonitrile and propionitrile, amines such pyridine and triethylamine, nitromethane, carbon disulfide, and the like. These mediums may be used on their own or in combination.

Where an organic compound, which is not dissolved in such a liquid medium, is employed, it is preferred to use a binder resin. In this case, the binder resin is dissolved in a solvent therefor, in which an insoluble organic compound is uniformly dispersed.

The total concentration of an organic compound and, if present, a binder resin in the solution or dispersion to be sprayed depend greatly on an intended film thickness, the types of solvent, organic compound and resin, the size and structure of an apparatus used, the shape of nozzle, the spraying rate, and the nozzle heating temperature, and should preferably be experimentally determined so that a film-forming time becomes shortest.

If a film formed as thin as possible is desirable, it is preferred that the total concentration of an organic compound and a binder resin is from 0.1 mg/ml to 0.01 mg/ml or below. If it is intended to obtain a film, which is as thick as possible, within a short time, a higher concentration is preferred. However, too high a concentration is very liable to cause troubles of clogging the nozzle. Although depending greatly on the type of organic compound and/or binder resin and the configuration of nozzle, it was experimentally confirmed that a nozzle, which was able to spray a solution of 0.1 mg of highly coagulative tetra-tert-butyl copper phthalocyanine per ml of dichloromethane without any problem, was clogged immediately after commencement of spraying when using a solution containing 0.02 mg/ml of the copper phthalocyanine. When using the same nozzle, a solution of 0.1 mg of poly(benzylmethacrylate) in 1 ml of acetone could be sprayed without causing any trouble. As will be apparent from the above, an optimum concentration of an organic compound and/or a binder resin should be determined experimentally while taking various factors mentioned above into account.

If a resin binder is used, the content of an organic compound is 1 ppm to 99.9 wt % based on the total of the organic compound and the resin binder. This wide range of content of the organic compound depends on the type of organic compound and the purpose. For instance, fluorescent dyes may be added to a resin binder on the order of ppm as is known in the art.

The solution or dispersion is sprayed in a vacuum chamber onto a substrate which has been preliminarily encoded with information in the form of pits and/or a continuous groove, or grooves, thereby forming a thin film containing an organic compound having optical functionality.

In the practice of the invention, the mist or fine droplets sprayed from a spray nozzle into a vacuum chamber should be in a substantially solvent-free condition on contact with the substrate. In order to create the "substantially solvent-free condition", various parameters, mutually interrelated with one another, have to be totally controlled. The parameters broadly include physical constants and operation parameters.

Physical constants include:

(1) a latent heat of vaporization of solvent;

(2) a solidifying temperature of solvent; and (3) a vaporization rate of solvent from droplets in vacuum.

A heat energy exceeding the latent heat of vaporization (1) has to be supplied. With regard to (2), if a latent heat of vaporization is deprived of droplets in vacuum and any heal; energy is not supplied to the droplets, dissipation of a solvent depends on "sublimation" at the time when the temperature of the droplets arrives at a solidifying temperature of the solvent. The sublimation speed is very slow. Accordingly, complete removal of the solvent prior to arrival at the substrate becomes difficult.

As for the vaporization rate under (3) above, the droplets are full of a solvent vapor therearound, and vaporization from the droplets takes place at a pressure different from "an average pressure" in a vacuum chamber. The diffusion velocity of the solvent vapor from around individual droplets depends on the structure of apparatus and the pressure distribution.

Operation parameters include:

(4) a nozzle heating temperature;

(5) a spraying rate of solution or dispersion; and (6) a distance between the nozzle and the substrate.

If the nozzle heating temperature is too high, the nozzle is clogged. The spraying rate (5) is readily controllable. In practice, a higher rate is preferred. The distance set out under (5) above has relation with a design of an apparatus in whole and has a relatively low in freedom.

Once again, the latent heat of vaporization and the solidifying temperature set out under (1) and (2) above are, respectively, a physical constant. The vaporization rate (3) is considered to be a kind of constant determined only experimentally and a value inherent to an apparatus used, and is under the influence of operation conditions. The spraying rate (5) and the distance between the nozzle and the substrate are under control of the vaporization rate. The nozzle heating temperature (4) is determined depending on the spraying rate and the configuration of nozzle.

Based on the above assumption, the vaporization rate of solvent from droplets discharged in vacuum depends on the type of apparatus as to how far a solvent vapor generated around individual droplets is dissipated. In order to make a solvent vaporization rate at a high level sufficient for practical applications, it is preferred to use a liquid cooling trap and a vacuum pump whose exhaust velocity is as great as possible. Especially, the liquid cooling trap is very effective.

Further, an optimum value of the nozzle heating temperature can be experimentally determined depending on the spraying rate and the configuration of the nozzle. If the heating temperature is lower than the optimum value, the spraying rate cannot be increased. On the contrary, when the heating temperature exceeds the optimum value, a solution or dispersion is very likely to be evaporated to dryness at a nozzle portion, thereby clogging the nozzle.

The distance K (m) between the nozzle and the substrate can be expressed according to the following equation $$K=L\times(w/v)$$

wherein L represents an average speed of the droplets sprayed from the nozzle, w represents an average weight (g) of droplets sprayed from the nozzle, and v represents a solvent evaporation speed (g/second), which is determined depending on the type of spraying solution, the configuration of nozzle, the nozzle heating temperature and the form of apparatus. In practice, the value of v is not constant and becomes slower as the solvent is removed from individual droplets, and thus, a dye and/or resin solid starts to appear or settle in the droplet. Accordingly, the distance should be experimentally determined by controlling the spraying rate so that the substrate suffers little damage of solvent.

In general, for the complete removal of a solvent from the droplets, it takes a very long time because the deposited solid matter impedes the movement of the molecules of the solvent. For instance, complete removal of a volatile matter from PMMA globules having a diameter of several micrometers takes several hours or longer when heated under conditions of $10^{-4}$ Pa and 100° C. or higher.

Accordingly, in order to achieve practically permissible spraying rate and film-forming speed, a solvent may be left in amounts not impeding the substrate. This is a substantially solvent-free condition.

The vacuum film-forming conditions including an inner pressure in a vacuum chamber, a spraying rate of solution or dispersion, a distance between a spray nozzle and a substrate, and a nozzle temperature are described along with means for effectively creating a substantially solvent-free condition of sprayed mist.

Figure 2:
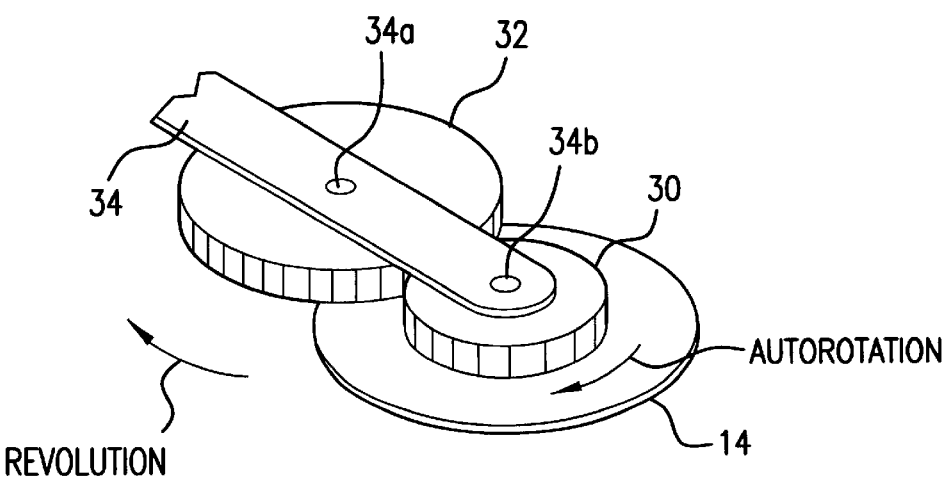
FIG. 2 is a schematic view illustrating a rotation mechanism of a support for substrate used in a vacuum film-forming apparatus.

Reference is now made to the accompanying drawings, particularly, to FIGS. 1 and 2. In FIG. 1, there is shown a film-forming vacuum apparatus used to form a thin film containing an organic compound on a substrate. In the figure, there is generally shown a film-forming apparatus A having a vacuum chamber 10 within which a rotary support 12 for substrate is provided as shown. Indicated by 14 is a substrate fixedly attached to the support 12. The substrate 14 can be rotated by rotation of the support 12. A spray nozzle 16 is provided in face-to-face relation with the substrate 14 at the wall of the vacuum chamber 10 as shown. The nozzle 16 is connected to a pressurizing feed pump 18. The nozzle 16 has a heater (not shown) for temperature control. A solvent or liquid medium trap 20 is placed at the rear side of the support 12, through which vapor of the solvent or liquid medium is collected in the form of a frozen state after evaporation thereof. The trap 20 is connected to a turbo pump 22 and a vacuum pump 24 both for exhaustion.

Indicated by 41 is a rotatable shutter plate which can interrupt a mist from the spray nozzle 16 as desired, and by 42 is a drive means for the shutter plate 41. Moreover, a lamp 50 is provided over the chamber 10 so that light with a band of wavelength capable of being absorbed with a mist 44 sprayed in the vacuum chamber, or IR light or heat rays is emitted through a window 51 against the mist 44. Indicated by 55 are parallel rays of the light.

FIG. 2 schematically shows a rotation mechanism of the support 12. The substrate 14 is rotated as a gear 30 rotates. The gear 30 is meshed with a larger-sized gear 32,under which the gears 30, 32 are ratably supported with an arm 34 at rotating shafts **34*a*, 34*b*, respectively. When the arm 34 is rotated about the rotating shaft 34*a*, the gear 30 rotates along the outer periphery of the gear 32 while rotating on its own axis. This ensures formation of a thin film with a uniform thickness on the substrate 14**.

In operation, the vacuum chamber 10 is first evacuated by means of the turbo pump 22 and the vacuum pump 24 to a given reduced pressure level, after which the trap 20 is cooled by use of liquid nitrogen or a helium circulating refrigerator (not shown) to a temperature much lower than a solidifying temperature of a solvent or liquid medium used, e.g. to a boiling point of liquid nitrogen of −196° C. For instance, the solidifying temperature of acetone is about −95° C. and that of dichloromethane is about −97° C. If the temperature of the trap 20 is close to a solidifying temperature of a solvent or liquid medium, the vapor of the solvent or medium cannot be frozen satisfactorily, making it difficult to completely collect the vapor therein. The trap surfaces are gradually covered with solidified solvent or medium, and thus, the cooling efficiency gradually lowers. In order to make up for the lowering deficiency, the trap temperature should be preferably cooled to a level which is lower than and a solidifying temperature of a solvent used and which is as low as possible.

Needless to say, the liquid trap has a limited capacity. Where only one liquid trap is used, the film formation has to be stopped at an upper limit of the trap capacity. If necessary, two or more liquid traps may be provided wherein they are individually detachable from the vacuum chamber while keeping it in vacuum. In this case, a liquid trap whose surfaces are fully deposited with a frozen solvent or medium is removed for re-use, and a fresh one is, in turn, in operation. In this way, the film formation can be continuously performed.

Then, a solution or dispersion containing an organic compound and/or a resin binder is pressurized and fed, by means of the pressurizing feed pump 18, to the nozzle 16 wherein the solution is heated to a temperature controlled by means of a heater (not shown). The thus temperature-controlled solution or dispersion is sprayed into the vacuum chamber in the form of a mist 44.

The temperature of the solution or dispersion to be sprayed is appropriately controlled depending on the type of solvent, the type of organic compound, the configuration of nozzle, and the spraying rate or speed of solution or dispersion. If these variables or parameters are determined, an optimal nozzle heating temperature may be determined. In practice, such a heating temperature should be determined experimentally. In order to facilitate the vaporization of a solvent from the sprayed mist, a higher nozzle heating temperature is preferred. However, too high a heating temperature may cause the nozzle to be clogged. In the worst case, an organic compound contained in the solution may be thermally decomposed. In order to prevent the clogging of the nozzle, it is preferred that the nozzle heating temperature is set at a relatively low level at the initial stage of spraying. Thereafter, the temperature is gradually brought close to the optimum level. Using this technique, the temperature of an initially sprayed mist is lower than the optimum temperature, and thus, the deposition of such a mist on a substrate has to be prevented. To this end, the rotatable shutter plate 41 is used to transiently interrupt the mist thereat. When spraying is started, the mist from the nozzle is shut off by means of the shutter plate 41 so that the mist does not arrive at the substrate. The nozzle heating temperature reaches the optimal level, after which the shutter plate 41 is rotated to pass the mist toward the substrate.

The spraying rate or speed of the solution or dispersion is suitably controlled by means of the pressurizing feed pump 18. The vacuum chamber 10 is controlled at a given reduced pressure by controlling evacuating rates of the turbo pump 22 and the vacuum pump 24.

Further, the distance between the nozzle 16 and the substrate 14 can be appropriately controlled so that most of the liquid medium sprayed in the form of mist is vaporized on the way of from the spray nozzle 16 to the substrate 14. As a result, a film-forming material or dye, which is substantially free of any liquid medium, is deposited on the substrate. The vaporized medium is collected in the trap 20. After completion of the spraying, the substrate 14 is heated to completely remove any volatile components, such as the medium, from the deposit on the substrate. The resultant thin film is usually formed in a thickness of 10 to 2000 nanometers on dry basis although depending on the type of disk.

When using, as the substrate, a disk having a diameter of 40 mm to 300 mm and also, as a solvent or liquid medium, a compound having a boiling point of 30 to 120° C. at normal pressures and a melting point of −20° C. or below, the vacuum film-forming conditions used to realize formation of a thin film with a uniform thickness in a substantially solvent-free condition should preferably include a reduced pressure of 1 to $10^{-6}$ Pa in the vacuum chamber, a spraying rate of a solution or dispersion of 1 namoliter/minute to 1 ml/minute, an exhaust velocity of 50 liters/minute to 100 $m^3$/minute on the basis of 1 atm and 20° C., and a distance between the spray nozzle and the substrate of 1 to 10 times the diameter of the substrate while keeping a nozzle temperature at a level higher than a melting point of a solvent used and not higher than its boiling point at normal pressures and also keeping a liquid trap temperature at a level lower by 10° C. or above than a melting point of the solvent used.

Further, the substantially solvent-free condition is more reliably established when the mist sprayed from the nozzle is irradiated with light having a wavelength capable of being absorbed with the sprayed mist in vacuum or IR or heat rays. The irradiation enables one to supply a heat energy to the mist standing adiabatically in vacuum, so that vaporization of a solvent in the mist is facilitated.

For the irradiation, a light source used includes an ordinary tungsten lamp or halogen lamp in combination with a reflection mirror, which is hyperboloidal or elliptical in section. In this way, parallel rays are obtained. The shape in section of the parallel rays is not critical. Heating of mist is explained using parallel rays whose section is round.

The diameter of the round section is preferably 0.5 to 5 times the diameter of the substrate. The parallel rays are optimally irradiated in a direction intersecting substantially at right angles relative to the direction of spraying the mist from the nozzle although the direction may be inclined to around 70° from the intersecting directions. The lamp 50 in FIG. 1 may be disposed inside the vacuum chamber 10, or may be placed at the outside of the chamber 10. In the latter case, light may be irradiated through a window formed at the outer wall of the chamber as shown in the figure.

The output power of the lamp is determined depending on the light absorption characteristics in UV, IR and visible light regions of an optically functional, organic compound and, if present, a binder resin. If the organic compound consists of a dye and the substrate has a diameter of 40 mm to 120 mm, it is preferred to use a glow lamp with electric power of 100 W to 500 W. With the diameter of the substrate ranging from 120 mm to 300 mm, the power is preferably in the range of 200 W to 2 kW. Where an organic compound used does not exhibit any absorption in the visible light range, an infrared lamp is used. The power of the lamp should preferably be 2 to 10 times greater than that of the glow lamp. Moreover, where an organic compound used is sensitive to UV light and undergoes photolysis, a UV-cut filter is used.

The state of heating with the lamp can be monitored in the following way. In order to avoid an adverse influence by thermal conductivity, a needle thermocouple having a tip portion with a diameter of 0.1 to 0.2 mm is used. The thermocouple is coated with an optically functional organic compound used and a binder resin, if used, in a thickness of from 1 to 200 $\mu$m. The thus coated thermocouple is placed in the vacuum chamber at a position where the parallel rays are able to pass but the sprayed mist does not deposit on the thermocouple. The temperature of the thermocouple corresponds to an ultimate temperature attained in case where the mist is continuously heated by means of a lamp after complete evaporation of solvent from the mist. From the temperature of the thermocouple, an amount of heat supplied to the sprayed mist can be supposed. In this manner, where an organic compound used is liable to undergo thermal decomposition, irradiation with a lamp, which exceeds an energy necessary for the evaporation of solvent, can be avoided.

After completion of the spraying, the resultant thin film is heated to completely remove the solvent therefrom.

When the substrate and/or a binder resin is made of a thermoplastic resin, the heating temperature should not exceed a thermal deformation temperature of the thermoplastic resin. At the same time, the heating temperature should not exceed the melting temperature and thermal decomposition temperature of an organic compound used, or a temperature at which abrupt sublimation of the organic compound starts.

Where the substrate and binder resin are not thermoplastic, respectively, the heating temperature should not exceed the melting temperature and thermal decomposition temperature of an organic compound used, or a temperature at which abrupt sublimation of the organic compound starts.

In either of the above cases, if an organic compound and/or binder resin used undergoes reversible phase changes or crystal changes, the heating temperature should not exceed a temperature at which these changes start.

Specifically, when the substrate is made of polycarbonate and a low molecular weight organic compound is used without use of any binder resin, the resultant thin film is thermally treated at a temperature of 40° C. to 80° C. for 1 minutes to 2 hours. Moreover, when a binder resin is present, such a film is thermally treated at 40° C. for 24 to 48 hours and at 80° C. for 1 to hours.

In this way, the thin film containing an organic compound having optical functionality can be formed on the substrate without deforming the encoded information pits, or a shallow groove or grooves formed in the substrate beforehand. This is because the method of the invention permits in-situ deposition of an organic compound on the substrate without causing the organic compound to be flown at the time of the deposition on the substrate owing to the substantial absence of a solvent in the deposit.

The thin film may be further covered with a reflection film made, for example, of aluminum, and/or a protective film made, for example, of a UV-cured resin as is known in the art.

The invention is more particularly described by way of examples.

EXAMPLE 1

1,3,3,1',3',3'-Hexamethyl-2,2'-(4,5,4',5'-dibenzo)indodicarbocyanine perchlorate (cyanine dye) was dissolved in acetone to provide a solution having a concentration of the dye of 1 wt %. This solution was sprayed over a polycarbonate resin injection-molded substrate, which had been preliminarily formed with very fine pits (with a minimal bit length of 0.4 μm and a bit depth of 80 nm) of EFM signals whose density was about 4 times higher than that of an ordinary compact disk, by use of the vacuum film-forming apparatus shown in FIGS. 1 and 2, thereby forming a dye thin film having a thickness of about 250 nm. During the spraying, parallel rays from a 300 W halogen lamp attached with a paraboloidal reflection mirror with an aperture diameter of 60 mm were irradiated against the mist of the solution from a window, provided at an outer wall of the vacuum chamber, in a direction intersecting at right angles with the spraying direction. The heating temperature measured by means of a thermocouple coated on the surfaces thereof with the cyanine dye in a thickness of 10 μm was found to be 150° C., which was lower than a temperature at which the dye started to thermally decompose.

The vacuum film-forming conditions in the apparatus are shown below.

(1) Inner pressure of the vacuum chamber: $1\times10^{-4}$ Pa
(2) Spraying rate of the dye solution: 100 μl/minute
(3) Exhaust velocity in the vacuum chamber: 450 liters/minute (on the basis of 1 atm and 20° C.)
(4) Distance between the spray nozzle and the substrate: 180 mm
(5) Spray nozzle-heating temperature: 40° C.

Figure 3:
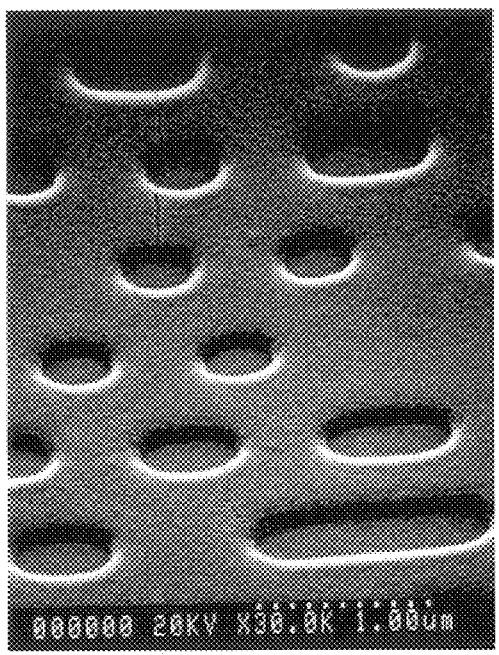
FIG. 3 is a scanning electron microphotograph of the surface of an optical recording medium obtained in Example 1 wherein the pit profile on the substrate surface is clearly seen.

After the formation of the thin film of the cyanine dye on the substrate, it was heated at about 60° C. for 1 hour. Thereafter, observation of the pits in the substrate surface through a scanning electron microscope (SEM) revealed that the pits were clearly seen without filling up with the dye. This is particularly shown in FIG. 3.

COMPARATIVE EXAMPLE 1

Figure 4:
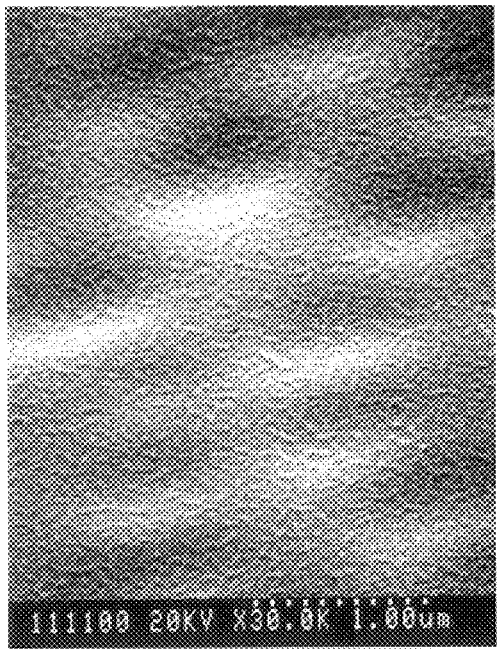
FIG. 4 is a scanning electron microphotograph of the surface of an optical recording medium obtained in Comparative Example 1 to illustrate the pit profile after coating.

Cyanine dye as used in Example 1 was dissolved in ethyl cellosolve (ethylene glycol monoethyl ether). The resultant solution was spin-coated onto such a polycarbonate resin injection-molded substrate having pits formed therein as used in Example 1 to form an about 300 nm thick dye thin film, followed by thermal treatment in the same manner as in Example 1. Observation of the pits in the substrate surface through SEM revealed that the pits was buried with the dye after the formation of the thin film. This is particularly shown in FIG. 4.

EXAMPLE 2

In this example, a superresolution optical disk having a mask layer containing a thermochromic compound capable of reverse reactions formed on a substrate.

A fluoranthene compound serving as an electron-donating color-developing compound and a bisphenol A color developer were mixed at a ratio by mole of 1:3 and dissolved in acetone to obtain a solution of the mixture at a concentration of 1 wt %.

The solution was sprayed onto a polycarbonate resin injection-molded substrate having fine pits (a minimal pit length of 0.4 μm and a pit depth of 80 nm) of EFM signals with a density which was as high as about 4 times that of an ordinary compact disk in the same manner as in Example 1 using the vacuum film-forming apparatus shown in FIGS. 1 and 2, thereby forming an about 800 nm thick dye thin film serving as a mask layer.

During the spraying, parallel rays from a 250 W IR lamp attached with a paraboloidal reflection mirror with an opening diameter of 120 mm were irradiated against the mist of the solution from a window, provided at an outer wall of the vacuum chamber, in a direction intersecting at right angles with the spraying direction. The heating temperature measured by means of a thermocouple coated on the surfaces thereof with the mixture used above in a thickness of 200 μm was found to be 120° C., which was lower than a temperature at which the organic compound started to thermally decompose.

The film-forming conditions in the apparatus are shown below.

(1) Inner pressure of the vacuum chamber: $1\times10^{-4}$ Pa
(2) Spraying rate of the dye solution: 360 μl/minute
(3) Exhaust velocity in the vacuum chamber: 450 liters/minute (on the basis of 1 atm and 20° C.)
(4) Distance between the spray nozzle and the substrate: 180 mm
(5) Spray nozzle-heating temperature: 40° C.

Further, aluminum was formed in a thickness of about 70 nm on the mask layer by vacuum sputtering for use as a reflection layer, followed by further formation of an about 7 μm thick protective layer made of a UV-cured resin (commercially available from Dainichiseika Colour & Chemicals Mfg. under the designation of SEIKA BEAMI VDAL-392), thereby obtaining a superresolution optical disk.

This disk was subjected to reproduction with a playback system using a semiconductive laser beam with a wavelength of 680 nm. For the reproduction, a numerical aperture (NA) of a pickup lens was set at 0.6, and reproduction conditions includes a constant linear velocity (CLV) of 3 m/second, a frequency of 1000 r.p.m., and a reproduction power of about 3.0 mW.

Figure 5:
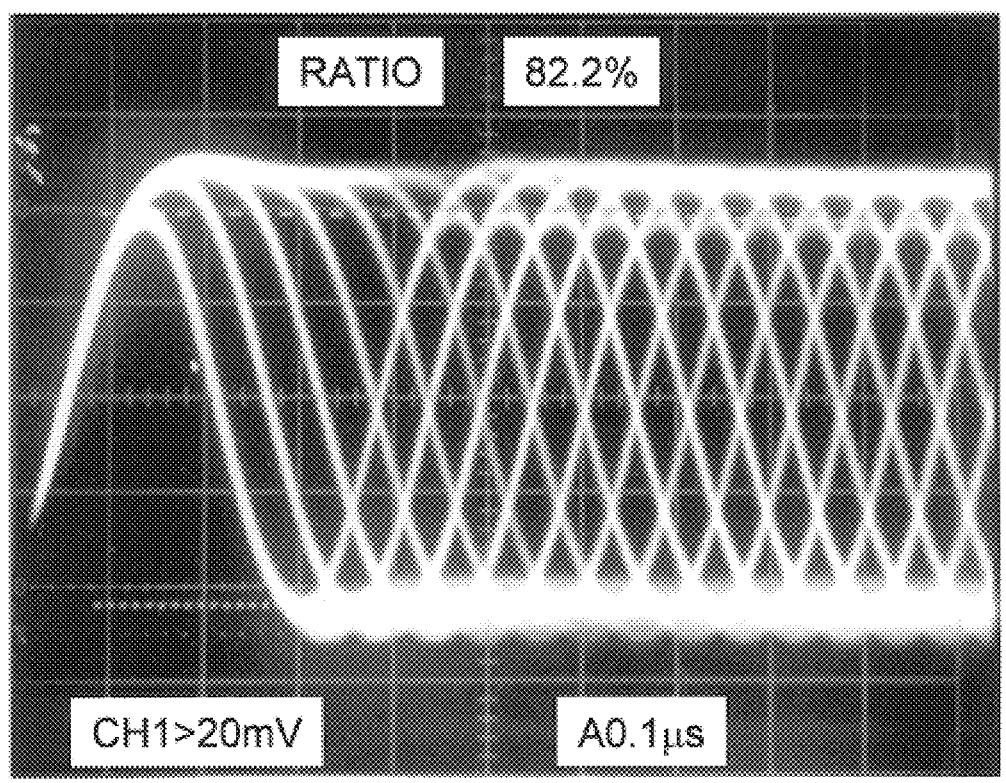
FIG. 5 is a photograph showing oscillographic waveforms obtained by taking eye patterns of reproduced signals of an optical recording medium obtained in Example 2.

When superresolved, the disk had such eye patterns as shown in the oscillographic waveforms of FIG. 5, revealing that the ratio between 3T signal amplitude and 11T signal amplitude was 82.2%, thus showing a very good frequency characteristic.

COMPARATIVE EXAMPLE 2

A fluoranthene compound as used in Example 2 and bisphenol A were mixed at a ratio by mole of 1:3 and dissolved in acetone to obtain a solution of the mixture at a concentration of 4 wt %.

Thereafter the solution was coated onto such a polycarbonate resin injection-molded substrate as used in Example 2 according to spin coating to form an about 700 nm thick thin film. Further, a reflection film and a protective film were, respectively, formed on the dye thin film in the same manner as in Example 2 to obtain an optical disk.

The disk was subjected to reproduction using a playback system as used in Example 2, but could not be reproduced because the thermochromic dye filled up the pits therewith.

As will be apparent from the foregoing, in case where a polycarbonate resin, which has a relatively low resistance to solvent, is used, the resin substrate is very unlikely to be attached with the solvent, and a thin film with a uniform thickness can be formed thereon. In addition, cyanine dyes, which do not sublimate on heating and cannot be formed as a layer according to vacuum deposition under heating, can be readily formed as a film.

What is claimed is:

1. A method for making an optical recording medium, which comprises:

providing a substrate which is encoded with information in a form of pits and/or a continuous groove beforehand at least on one side thereof, spraying, in a vacuum chamber, a solution or dispersion, in a liquid medium, of a film-forming material containing at least one organic compound having optical functionality in a form of a mist onto the at least one side of the substrate encoded with information while applying a heat energy sufficient to cause the liquid medium to be evaporated from the mist, evacuating and trapping the evaporated liquid medium as a solid in said vacuum chamber so as to create conditions sufficient to permit a thin film to be formed on said substrate in a substantially solvent-free condition, and thermally treating the thin film.

2. A method according to claim 1, further comprising irradiating said mist by light having a wavelength region capable of being absorbed by said mist and/or a heat ray to provide a heat energy for evaporating the liquid medium included in said mist.

3. A method according to claim 1, wherein said film-forming material consists essentially of said at least one organic compound.

4. A method according to claim 3, wherein said at least one organic compound consists of an organic dye.

5. A method according to claim 3, wherein said film-forming material consists essentially of a mixture of an organic dye and a resin binder.

6. A method according to claim 1, wherein said substrate consists of a disk having a diameter of 40 mm to 300 mm, said solution or dispersion comprises the liquid medium which consists essentially of a compound having a boiling point of 30° C. to 120° C. at 1 atm and a melting point of −20° C. or below, and said solution or dispersion is sprayed under conditions of a reduced pressure of 1 to $10^{-6}$ Pa in said vacuum chamber, a spraying rate of 1 nanoliter/minute to 1 ml/minute, an exhaust velocity of 50 liters/minute to 100 $m^3$/minute at 1 atm and 20° C., and a distance between a spray nozzle and said substrate of 1 to 10 times the diameter of said substrate while keeping a spray nozzle temperature at a level higher than the melting point of said liquid medium and not higher than the boiling point of the liquid medium at 1 atm and also trapping a vapor of said liquid medium in a liquid trap kept at a trap temperature lower by 10° C. or above than the melting point of said liquid medium.

7. A method according to claim 6, wherein said liquid trap is cooled by means of liquid nitrogen.

8. A method according to claim 1, wherein said substrate is made of a thermoplastic resin and said thin film is dried at a temperature not exceeding a thermal deformation temperature of said thermoplastic resin.

9. A method according to claim 1, further comprising forming a reflective film and a protective film on said thin film.

* * * * *